US012058410B2

(12) United States Patent
Huang

(10) Patent No.: US 12,058,410 B2
(45) Date of Patent: Aug. 6, 2024

(54) INFORMATION PLAY CONTROL METHOD AND APPARATUS, ELECTRONIC DEVICE, COMPUTER-READABLE STORAGE MEDIUM AND COMPUTER PROGRAM PRODUCT

(71) Applicant: TENCENT TECHNOLOGY (SHENZHEN) COMPANY LIMITED, Shenzhen (CN)

(72) Inventor: Jiawen Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 9 days.

(21) Appl. No.: 17/965,263

(22) Filed: Oct. 13, 2022

(65) Prior Publication Data

US 2023/0030502 A1    Feb. 2, 2023

Related U.S. Application Data

(63) Continuation of application No. PCT/CN2021/132027, filed on Nov. 22, 2021.

(30) Foreign Application Priority Data

Dec. 31, 2020 (CN) .......................... 202011622243.0

(51) Int. Cl.
*H04N 21/4402* (2011.01)
*H04N 21/472* (2011.01)
(Continued)

(52) U.S. Cl.
CPC ............... *H04N 21/440281* (2013.01); *H04N 21/47217* (2013.01); *H04N 21/4884* (2013.01); *H04N 21/8456* (2013.01)

(58) Field of Classification Search
CPC ..... H04N 21/440281; H04N 21/47217; H04N 21/4884; H04N 21/8456
See application file for complete search history.

(56) References Cited

U.S. PATENT DOCUMENTS

2007/0250311 A1* 10/2007 Shires ..................... G10L 21/04
704/226
2012/0054615 A1* 3/2012 Lin ................. H04N 21/234363
715/719
(Continued)

FOREIGN PATENT DOCUMENTS

CN    106911961 A    6/2017
CN    109451358 A    3/2019
(Continued)

OTHER PUBLICATIONS

The World Intellectual Property Organization (WIPO) International Search Report for PCT/CN2021/132027 Jan. 30, 2022 6 Pages (including translation).
(Continued)

*Primary Examiner* — Sunghyoun Park
(74) *Attorney, Agent, or Firm* — ANOVA LAW GROUP, PLLC

(57) ABSTRACT

This application provides an information play control method and apparatus, an electronic device, a computer-readable storage medium and a computer program product, and relates to the artificial intelligence technology. The method includes displaying play rate options in response to a triggering operation for a rate control identifier of a play interface, the play rate options comprising a smart adjustment option, the smart adjustment option being used for triggering play rate adjustment for multimedia information; determining a target rate ratio of the multimedia information based on content of the multimedia information in response to a triggering operation for the smart adjustment option;
(Continued)

adjusting a play rate of the multimedia information based on the target rate ratio to obtain adjusted multimedia information; and playing the adjusted multimedia information.

17 Claims, 9 Drawing Sheets

(51) Int. Cl.
*H04N 21/488* (2011.01)
*H04N 21/845* (2011.01)

(56) References Cited

U.S. PATENT DOCUMENTS

| | | | | |
|---|---|---|---|---|
| 2012/0102184 | A1* | 4/2012 | Candelore | H04N 21/6587 709/224 |
| 2014/0281002 | A1* | 9/2014 | Sun | H04N 21/64322 709/231 |
| 2016/0335045 | A1 | 11/2016 | Medaghri Alaoui et al. | |
| 2017/0085953 | A1* | 3/2017 | Pruden | H04N 21/47217 |

FOREIGN PATENT DOCUMENTS

| | | |
|---|---|---|
| CN | 110113666 A | 8/2019 |
| CN | 113542874 A | 10/2021 |

OTHER PUBLICATIONS

"SpeedNet: Learning the Speediness in Videos (CVPR 2020)", https://www.youtube.com/watch?v=dP2dS2ZQ9LQ.

"Straight to the Point: Fast-Forwarding Videos via Reinforcement Learning Using Textual Data", https://www.youtube.com/watch?v=mumJdoZIEQQ.

* cited by examiner

INFORMATION PLAY CONTROL METHOD AND APPARATUS, ELECTRONIC DEVICE, COMPUTER-READABLE STORAGE MEDIUM AND COMPUTER PROGRAM PRODUCT

RELATED APPLICATIONS

This application is a continuation of PCT Application No. PCT/CN2021/132027, filed on Nov. 22, 2021, which in turn claims priority to Chinese Patent Application No. 202011622243.0 filed on Dec. 31, 2020. The two applications are incorporated herein by reference in their entirety.

FIELD OF THE TECHNOLOGY

This application relates to an artificial intelligence technology, and particularly relates to an information play control method and apparatus, an electronic device, a computer-readable storage medium and a computer program product.

BACKGROUND OF THE DISCLOSURE

The Internet has a huge amount of multimedia resources, such as audio and video, which all can be played on a user terminal in order to enable the user to play the audio or video anytime and anywhere. To play multimedia data, the user often needs to adjust the play speed of the multimedia data, for example, to accelerate the play speed of the video to play the whole video within a shorter time, or to decelerate the play speed of the audio to learn a particular song carefully. However, the way in which the play speed of the multimedia information is controlled often does not adapt to different types of multimedia information, making the effect for controlling the play rate of the multimedia information less effective.

SUMMARY

Embodiments of this application provide an information play control method and apparatus, an electronic device, a computer-readable storage medium and a computer program product, which can improve the effect of play control over multimedia information.

The technical solutions of the embodiments of this application are implemented as follows:

One aspect of the present disclosure provides an information play control method. The method includes displaying play rate options in response to a triggering operation for a rate control identifier of a play interface, the play rate options comprising a smart adjustment option, the smart adjustment option being used for triggering play rate adjustment for multimedia information; determining a target rate ratio of the multimedia information based on content of the multimedia information in response to a triggering operation for the smart adjustment option; adjusting a play rate of the multimedia information based on the target rate ratio to obtain adjusted multimedia information; and playing the adjusted multimedia information.

An embodiment of this application provides an electronic device for information play control, including a memory, configured to store executable instructions; and a processor, configured to implement the information play control method provided in the embodiments of this application when executing the executable instructions stored in the memory.

An embodiment of this application provides a computer-readable storage medium storing executable instructions, the executable instructions, when executed by a processor, implementing the information play control method provided in the embodiments of this application.

The embodiments of this application have the following beneficial effects. When the smart adjustment option is triggered, the electronic device can analyze content information of the multimedia information, determine the dynamic target rate ratio, and then use the target rate ratio to adjust the play rate of the multimedia information, so that the play rate of the multimedia information is dynamic, and the change is related to the content of the multimedia information, thus making control over the play rate of the multimedia information more intelligent, and improving the effect of play control over the multimedia information.

DESCRIPTION OF EMBODIMENTS

Figure 1:
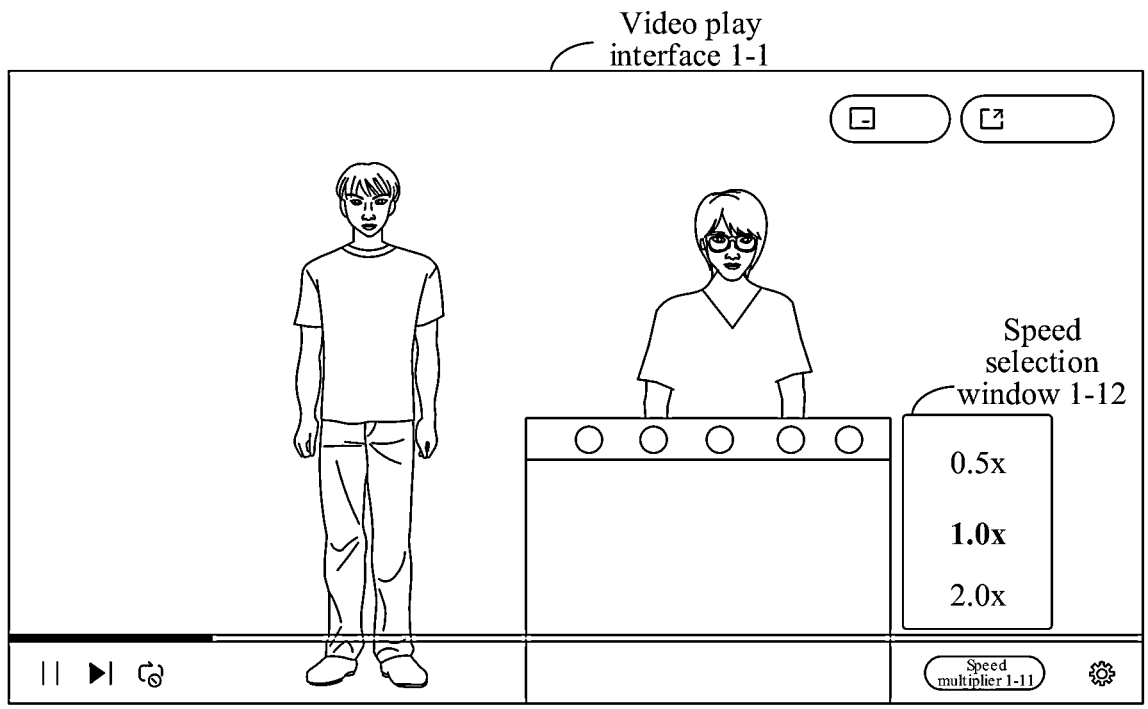
FIG. 1 is a video play rate adjustment method.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, terms involved in the embodiments of this application are described. The terms provided in the embodiments of this application are applicable to the following explanations.

1) Artificial Intelligence (AI) is a theory, method, technology, and application system that uses a computer or a machine controlled by the computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, so that the machines can perceive, infer, and make decisions.

AI technology is a comprehensive discipline, covering a wide range of fields including both a hardware-level technology and a software-level technology. AI technologies generally include technologies such as a sensor, a dedicated AI chip, cloud computing, distributed storage, a big data processing technology, an operating/interaction system, and electromechanical integration. AI software technologies mainly include a computer vision technology, a speech processing technology, a natural language processing (NLP) technology, machine learning (ML)/deep learning, and the like.

2) The computer vision (CV) is a science that studies how to use a machine to "see", and furthermore, refers to using a camera and a computer to replace human eyes for performing machine vision, such as recognition, tracking, and measurement, on a target, and further perform image processing, so that the computer processes the target into an image more suitable for human eyes to observe, or an image transmitted to an instrument for detection. As a scientific discipline, computer vision deals with related theories and technologies in an attempt to create an artificial intelligence system capable of obtaining information from images or multidimensional data. The CV technologies usually include technologies such as image processing, image recognition, image semantic understanding, image retrieval, optical character recognition (OCR), video processing, video understanding, video content/behavior recognition, three-dimensional object reconstruction, a 3D technology, virtual reality, augmented reality, synchronous positioning, or map construction, and further include biological feature recognition technologies such as common face recognition and fingerprint recognition. OCR refers to a process of determining the shape of printed characters by detecting darkness and brightness, and then using a character recognition method to translate the shape into computer text.

3) Video understanding may be understood as extracting semantic concepts in human thinking from video content to facilitate making decision on processing of the video and the like based on the obtained semantic concepts.

4) NLP is an important direction in the fields of computer science and AI. It studies various theories and methods that enable effective communication between humans and computers in natural language. NLP is a science that integrates linguistics, computer science and mathematics. Therefore, studies in this field relate to natural languages, that is, languages used by people in daily life, and NLP is closely related to linguistic studies. NLP technologies usually include text processing, language understanding, machine translation, robot question answering, knowledge graphs and other technologies.

5) ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to acquire new knowledge or skills, and reorganize an existing knowledge structure, to keep improving its performance. The ML is the core of the AI, is a basic way to make the computer intelligent, and is applied to various fields of AI. ML and DL usually include technologies such as artificial neural network, belief network, reinforcement learning, transfer learning, and inductive learning.

The Internet has a huge amount of multimedia information resources, such as video and audio, which all can be played on a user terminal in order to enable the user to watch the multimedia information anytime and anywhere. In response to watching the multimedia information, the user often needs to adjust the play speed of the multimedia information, for example, to accelerate the play speed of the video to play the whole video within a shorter time, or to decelerate the play speed of the audio to learn a particular song carefully.

In the following, video is taken as an example to describe a multimedia information play control method. Adjustment of a video play speed can be achieved in the following three methods. The first method is to use a fixed rate selected by the user as a play rate of the video. In some embodiments, FIG. 1 is a video play rate adjustment method, when a terminal detects that a user has clicked/tapped a speed multiplier 1-11 button in a video play interface 1-1, 1.0× is selected from various play rate options, i.e., 0.5×, 1.0× and 2.0×, provided in a pop-up speed selection window 1-12, and the terminal implements control over play of video according to an original play speed. However, in this method, the video is always played at a constant rate. When the amount of information in video content is small, this method does not cause discomfort to the user, but when the amount of information in the video content is large or the speech rate of the video is fast, this method is very likely to cause discomfort to the user.

Figure 2:
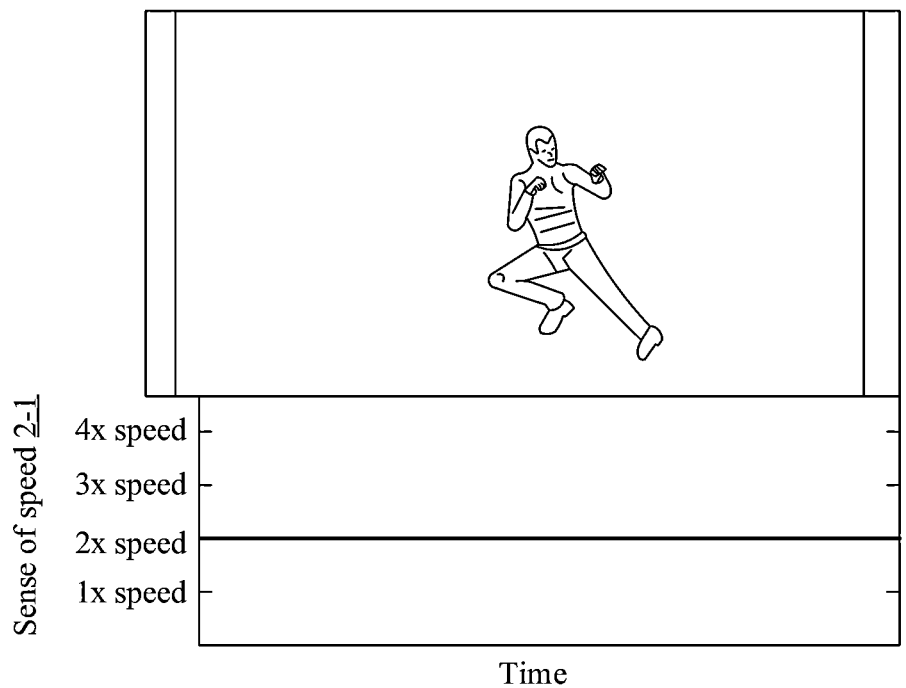
FIG. 2 is a schematic diagram of adjusting the sense of speed of a video.

The second method is to analyze the sense of speed of the video content from the dynamic condition of frames and then adjust the video to be more uniform in the sense of speed. In some embodiments, FIG. 2 is a schematic diagram of adjusting the sense of speed of a video. A terminal determines the sense of speed based on actions of characters in the video and maintains a sense of speed 2-1 of the character always at a 2× speed, or a 1× speed, a 3× speed or even a 4× speed (the exact multiplied speed is determined by the degree of compression of the video in time, for example, it is a 2× speed when the time is required to be half of original time). However, in response to being applied to video play control, this method actually assigns a play rate to each moment according to a constant rate, therefore the adaptive adjustment of the video play speed cannot be realized. Moreover, this method is better for controlling the play rate for video content of sport and more dynamic video content, but is limited in effect for controlling the play rate for video content with more voice information, such as films and television.

Figure 3:
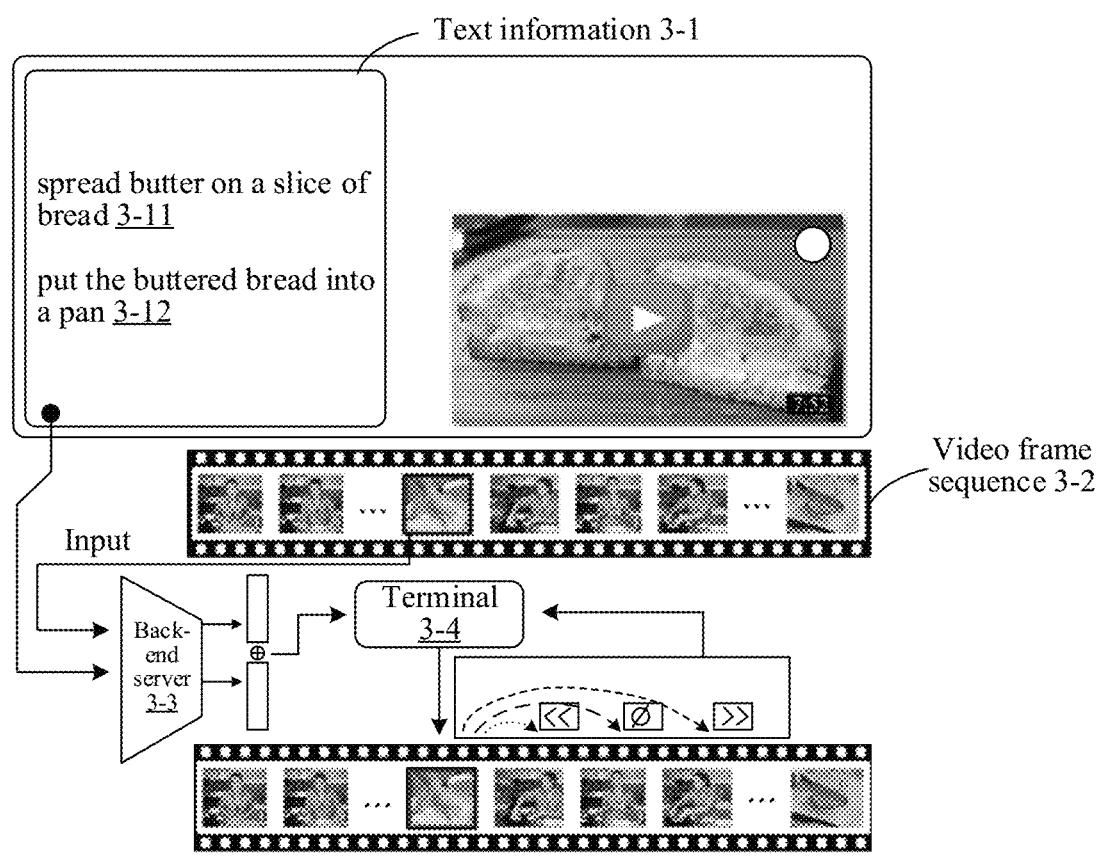
FIG. 3 is a schematic diagram of controlling a video play rate by identifying key segments.

The third method is to identify key segments of a video by video understanding and NLP, and then set different rates for each segment. This manner typically requires text information to guide the identification of the key segment. In some embodiments, FIG. 3 is a schematic diagram of controlling a video play rate by identifying key segments. Referring to FIG. 3, text information 3-1 includes "spread butter on a slice of bread 3-11", "put the buttered bread into a pan 3-12" and the like, the text information 3-1 and a video frame sequence 3-2 will be inputted into a network model of a back-end server 3-3, and the key segment is determined according to the network model, to inform a terminal 3-4 which are the key segments, and the terminal accelerates non-key segments, and plays the key segments at an initial rate, and even decelerates more important segments, to realize control over the play rate of a video. However, this method is effective when instructional text information describes entity content, and when the text information describes the semantics, scenario, main actors and the like of a video, or when there is no instructional text information, the effect of controlling the play rate of the video is poor.

It can be seen from the above-mentioned analysis that the above-mentioned control method for the play rate has a low adaptation degree to different types of videos, so that the control effect on the play rate of the video is poor, and finally the effect of video play control is poor.

Embodiments of this application provide an information play control method and apparatus, an electronic device, a computer-readable storage medium and a computer program product, which can improve the effect of play control over multimedia information. An exemplary application of an electronic device for information play control provided by an embodiment of this application is described below, and the electronic device for information play control provided by this embodiment of this application may be implemented as a terminal or as a server. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal may be a smartphone, a tablet computer, a notebook computer, a desktop computer, a smart speaker, a smartwatch, a smart home appliance, a vehicle-mounted device, or the like, but is not limited thereto. The terminal and the server may be directly or indirectly connected in a wired or wireless communication manner. This is not limited in the embodiments of this application. In the following, the exemplary application of the electronic device for information play control will be described.

Figure 4:
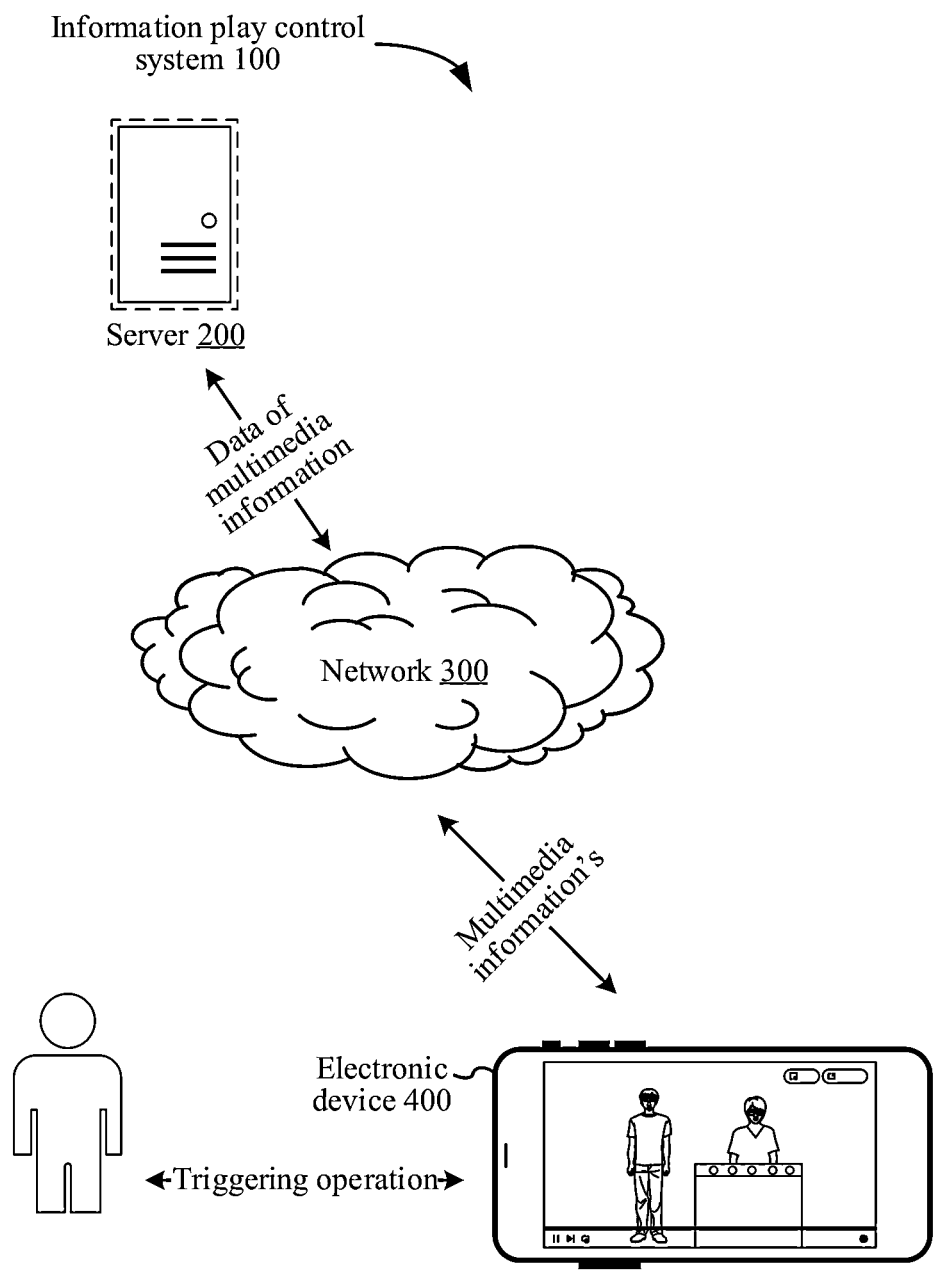
FIG. 4 is a schematic architectural diagram of an information play control system provided by an embodiment of this application.

Referring to FIG. 4, FIG. 4 is a schematic architectural diagram of an information play control system provided by an embodiment of this application. In order to support an information play control application, in an information play control system 100, an electronic device 400 is connected to a server 200 via a network 300, and the network 300 may be a wide area network or a local area network, or a combination of the wide area network and the local area network.

The server 200 is configured to provide data of multimedia information to the electronic device 400, and the electronic device 400 is configured to receive the data of the multimedia information, play the multimedia information, and control the play of the multimedia information based on user's operation.

The electronic device 400 is configured to display play rate options in response to a triggering operation for a rate control identifier of a play interface. The play rate options include an smart adjustment option, the smart adjustment option being used for triggering dynamic rate adjustment for the multimedia information. When the electronic device 400 detects a triggering operation on the smart adjustment option, a target rate ratio of the multimedia information is determined based on content of the multimedia information in response to the triggering operation for the smart adjustment option, where, the target rate ratio is dynamic. Then, the electronic device 400 uses the target rate ratio to adjust a play rate of the multimedia information to obtain adjusted multimedia information. Finally, the electronic device 400 will play the multimedia information, for example, when the multimedia information is a video, the electronic device 400 displays the adjusted video in a video play area of a video play interface.

Figure 5:
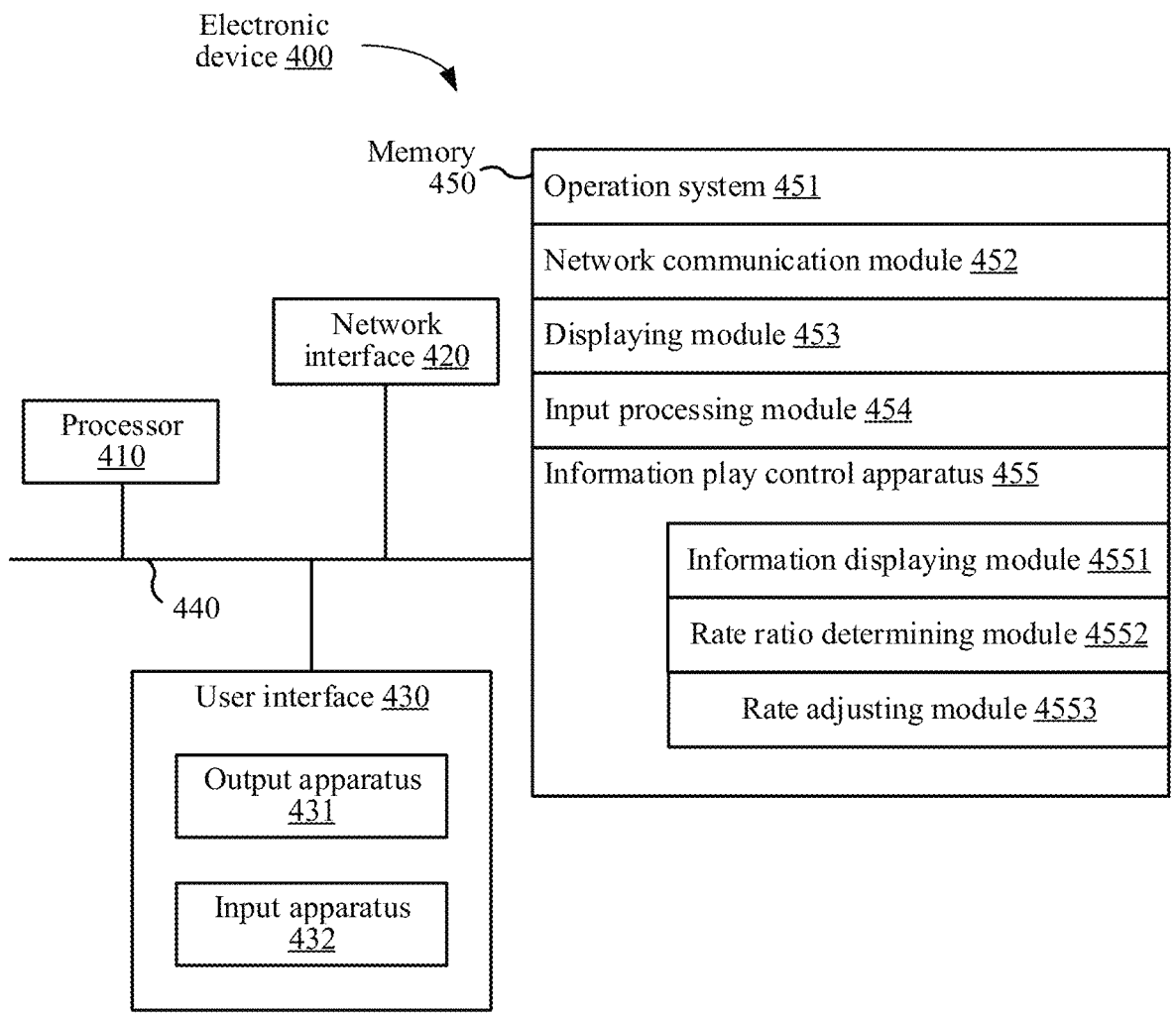
FIG. 5 is a schematic structural diagram of an electronic device for information play control provided by an embodiment of this application.

Referring to FIG. 5, FIG. 5 is a schematic structural diagram of an electronic device for information play control provided by an embodiment of this application, and the electronic device 400 shown in FIG. 5 includes: at least one processor 410, a memory 450, at least one network interface 420, and a user interface 430. All the components in the electronic device 400 are coupled together by using a bus system 440. It may be understood that the bus system 440 is configured to implement connection and communication between the components. In addition to a data bus, the bus system 440 further includes a power bus, a control bus, and a state signal bus. However, for ease of clear description, all types of buses are marked as the bus system 440 in FIG. 5.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that can display media content, including one or more speakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Exemplary hardware devices include a solid-state memory, a hard disk drive, an optical disc driver, or the like. The memory 450 may include one or more storage devices physically remote from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, such as a framework layer, a core library layer, or a driver layer, and is configured to implement various basic services and process a hardware-based task.

A network communication module 452 is configured to access other computing devices via one or more (wired or wireless) network interfaces 420, exemplary network interfaces 420 including: Bluetooth, Wireless Fidelity (WiFi), Universal Serial Bus (USB), etc.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, an information play control apparatus provided by an embodiment of this application can be implemented by software, FIG. 5 shows an information play control apparatus 455 stored in the memory 450, and the information play control apparatus can be software in the form of a program, a plug-in and the like, and includes the following software modules: an information displaying module 4551, a rate ratio determining module 4552, and a rate adjusting module 4553. These modules are logical, and thus are able to be combined in any way or further split according to functions to be implemented. The following describes functions of the modules.

In some other embodiments, the information play control apparatus provided in the embodiments of this application may be implemented by using hardware. For example, the information play control apparatus provided in the embodiments of this application may be a processor in a form of a hardware decoding processor, programmed to perform the information play control method provided in the embodiments of the application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

In some embodiments, an embodiment of this application provides an electronic device for information play control, including:

a memory, configured to store executable instructions; and a processor, configured to perform the information play control method provided in the embodiments of this application when executing the executable instructions stored in the memory.

In the following, an information play control method provided by an embodiment of this application will be described in combination with an exemplary application and implementation of an electronic device for information play control provided by an embodiment of this application.

Figure 6:
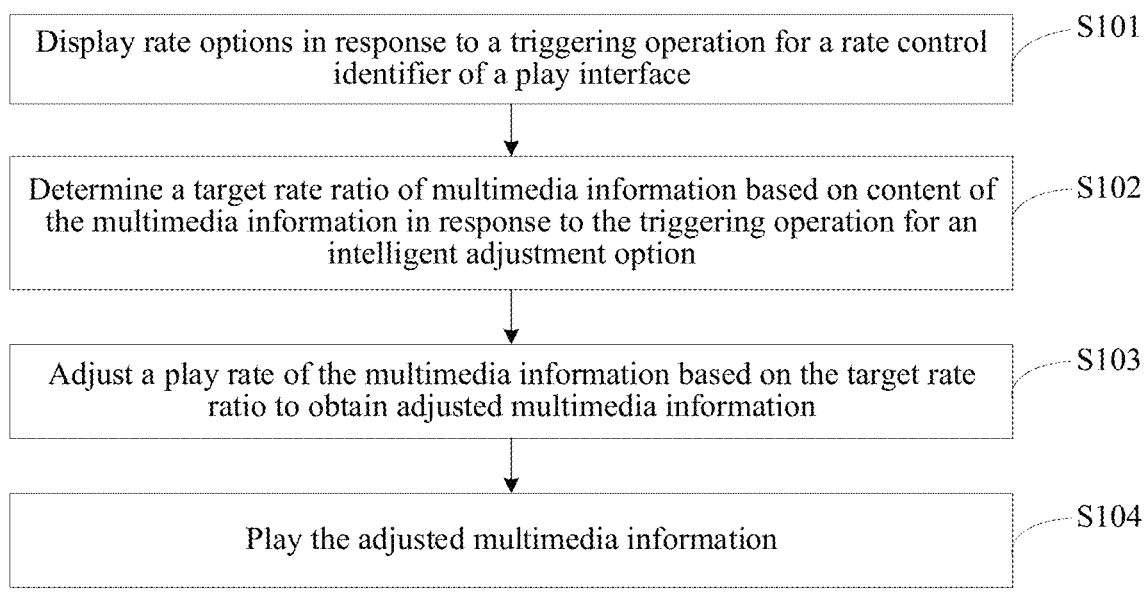
FIG. 6 is a schematic flowchart 1 of an information play control method provided by an embodiment of this application.

Referring to FIG. 6, FIG. 6 is a schematic flowchart 1 of an information play control method provided by an embodiment of this application, and description will be made in combination with steps shown in FIG. 6.

S101: Display play rate options in response to a triggering operation for a rate control identifier of a play interface.

This embodiment of this application is realized in a scene of performing play control on multimedia information played, for example, performing play control on video, audio and the like based on user's operation. An electronic device firstly detects in real time whether a user performs a triggering operation on a play interface, and after detecting the triggering operation, the electronic device further determines an area or an identifier where the user performs the triggering operation, to determine what function the user wants to achieve according to the position where the triggering operation occurs. When the electronic device detects the triggering operation of the user on a rate control identifier of the play interface, it is considered that the user has a need to adjust a play speed of multimedia information, so that a window for displaying the play rate options is created, and in this window, different play rate options are displayed to enable the user to make a selection according to his/her own need.

It is to be understood that, the play rate options in this embodiment include an smart adjustment option, the smart adjustment option being used for triggering dynamic rate adjustment for the multimedia information. That is to say, when the user does not want to adjust the play rate of the multimedia information according to a constant ratio, adaptive control over the play rate of the multimedia information can be achieved through this option. Of course, in some other embodiments, the play rate options may also include some fixed play rate options, e.g., a 2× speed, a 1.5× speed and the like and this embodiment of this application is not limited herein.

It can be understood that the play interface is displayed when the user triggers to play the multimedia information. The multimedia information can be videos that have been cached in the electronic device, can also be audios received by the electronic device in real time and the like, and this embodiment of this application is not limited herein.

It is to be understood that, the rate control identifier can be set in a first pre-set area of the play interface, where, both the size and position of the first pre-set area can be set according to specific use scenarios, for example, set at the bottom of the play interface with the size set to be 100×100, so as not to affect the user's watching of the multimedia information, or set at the upper right corner of the play interface with the size set to be 50×50.

Of course, the rate control identifier may also appear after the user operates the play interface, for example, only the multimedia information played exists in an original play interface, and the rate control identifier is displayed at the bottom of the play interface after the user clicks/taps the play interface.

In some embodiments, the play rate options are set in a second pre-set area of the play interface, and the size and position of the second pre-set area can also be set according to specific use scenarios, for example, set around the rate control identifier with the size set to be 200×200, or set in the center of the play interface with the size set to be 100×100. In some embodiments, transparency may also be set for the play rate options as desired, so that the play rate options may not obscure the video or audio which is being played.

It can be understood that the triggering operation for the rate control identifier may be a click/tap or a double click/tap by the user, or a long press by the user and the like. In some embodiments of this application, the triggering operation for the rate control identifier may also be the user's voice, e.g., a statement that the user says "help me adjust the video play speed", or a regular clapping sound of the user and the like.

It also can be understood that the triggering operation may be operations such as a click/tap, a double click/tap and the like, and may also be operations such as a long press, slide and the like, and this embodiment of this application is not limited herein.

Figure 7:
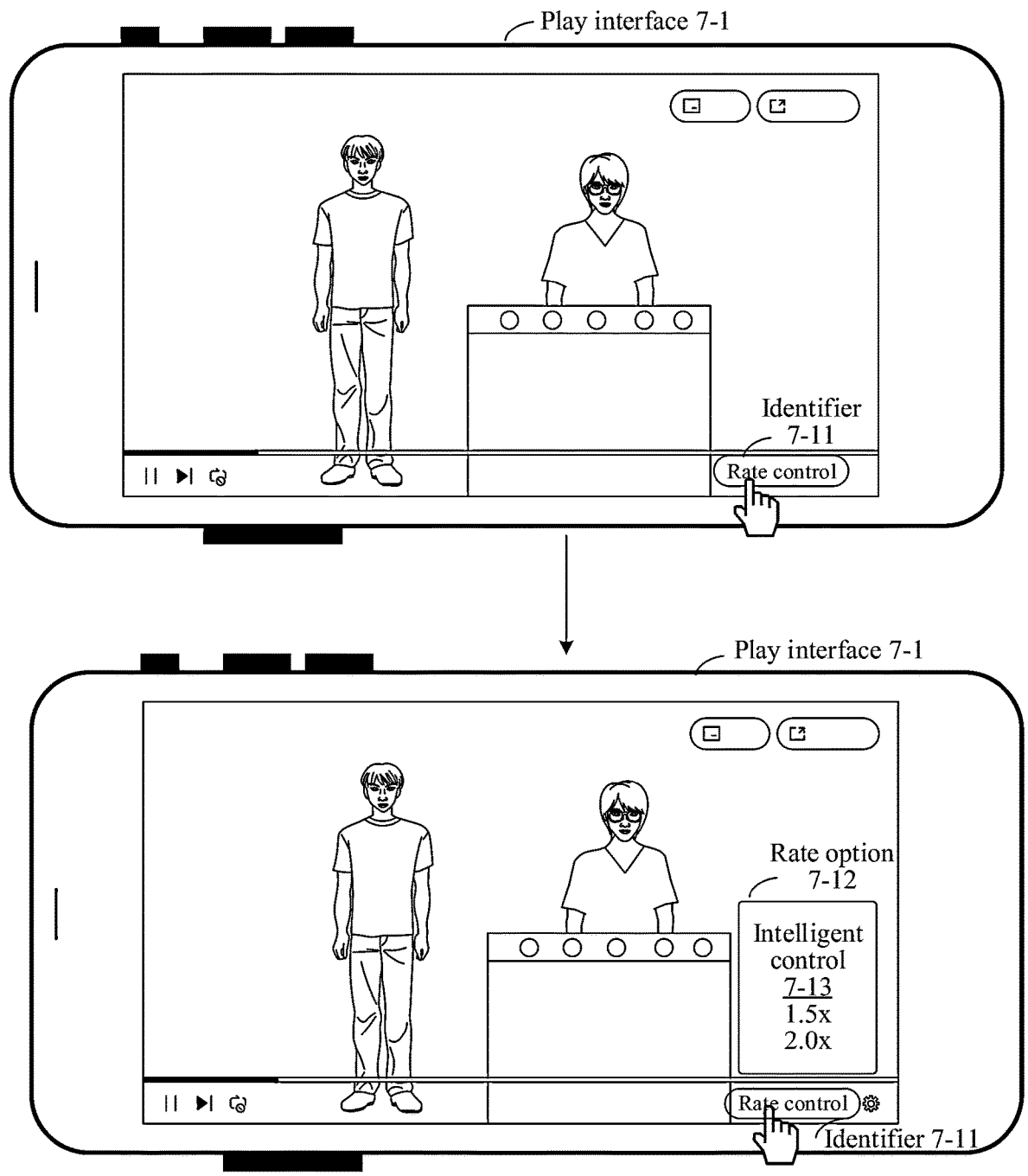
FIG. 7 is a schematic diagram of a window displaying play rate options provided by an embodiment of this application.

In some embodiments, an embodiment of this application provides a schematic diagram showing the play rate options. Referring to FIG. 7, a rate control identifier 7-11 is displayed at the bottom of a play interface 7-1, in response to that the user clicks/taps the rate control identifier 7-11, play rate options 7-12 pop up around the rate control identifier 7-11. In the play rate options 7-12, there is an smart adjustment option: intelligent control 7-13, as well as other options, such as a 2× speed (2×), a 1.5× speed (1.5×) and the like.

S102: Determine a target rate ratio of the multimedia information based on content of the multimedia information in response to the triggering operation for the smart adjustment option.

When the electronic device detects the triggering operation of the user on the smart adjustment option, it will be clear that the user specifies the function of dynamic rate adjustment for the multimedia information which is being played, and at this moment, the electronic device will analyze the content contained in the multimedia information, determine which parts of the multimedia information have specific content, or have content of interest to the user, determine whether to accelerate or decelerate the multimedia information according to the occurrence of the specific content or the content of interest to the user, and take a ratio of acceleration or a ratio of deceleration as the target rate ratio of the multimedia information.

It is to be understood that, not all the content information of the multimedia information contains specific content, or important content of interest to the user, so that the electronic device segments the multimedia information according to whether the specific content is included or not, or whether the important content or content of interest is included, and determines an appropriate rate ratio for different segments. That is to say, in this embodiment, the target rate ratio determined by the electronic device for the multimedia information is dynamic, i.e. changeable, rather than a constant value, and may be composed of respective rate ratios corresponding to different time periods.

In this embodiment, the content in the multimedia information includes, but is not limited to, images, audio, text, video semantics and the like. The image can be characters, animals, objects and the like which appear; the audio can be music, sound effects and the like; the text can be actor's lines displayed on a screen, lyrics of the audio and the like; and the video semantics can be the scenario, the interaction of characters and the like. The above-mentioned information can all be used for controlling the play rate of the multimedia information, for example, whether the information includes a specific character is determined, the video is accelerated when there is the specific character, or whether the information contains lyrics of interest to the user is determined, the audio is decelerated when there is the lyrics of interest to the user and the like.

It can be understood that the specific content can be specified by the user or specified by a publisher of the multimedia information; and information that is important and of interest to the user can be analyzed in combination with a user's portrait.

S103: Use the target rate ratio to adjust the play rate of the multimedia information to obtain adjusted multimedia information.

After obtaining the target rate ratio, the electronic device uses the target rate ratio to determine whether different parts of the multimedia information will be accelerated or decelerated, and specifically determines a ratio of acceleration or a ratio of deceleration, and then adjusts the play rate of each part according to the determined acceleration or deceleration ratio. For example, it may be desirable to accelerate the part without actor's lines in the video at a rate ratio of 1.5× to obtain adjusted video, so that this part of the video can be played at a higher speed.

Figure 8:
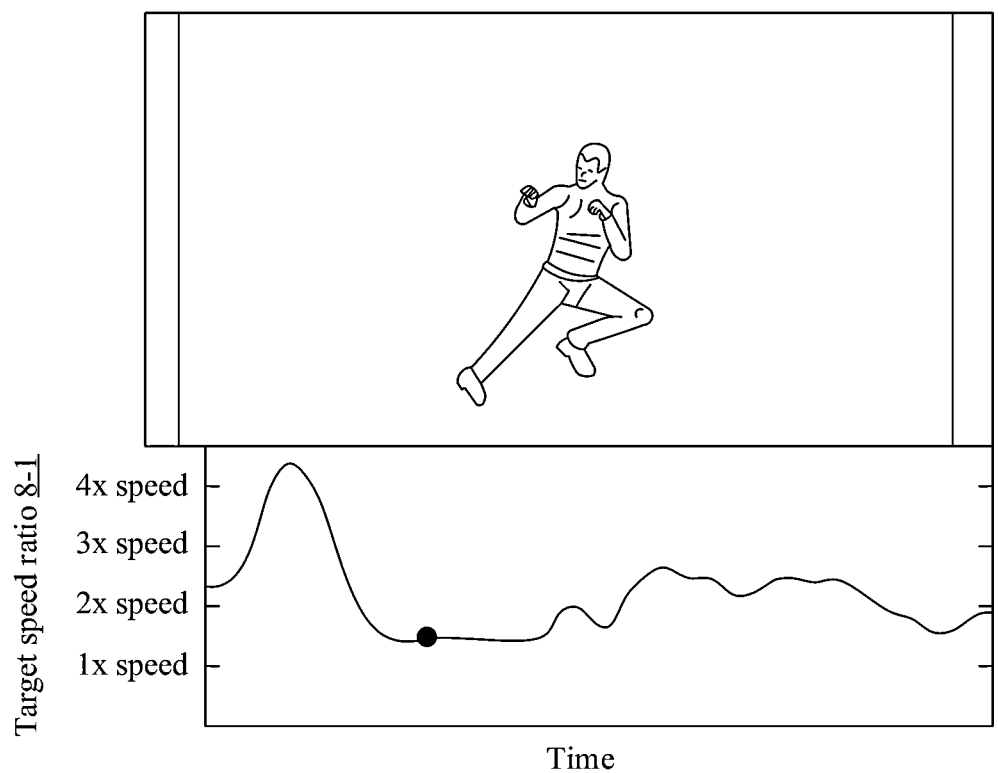
FIG. 8 is a schematic diagram of adjusted multimedia information provided by an embodiment of this application.

In some embodiments, an embodiment of this application provides a schematic diagram of the adjusted multimedia information. Referring to FIG. 8, the multimedia information is a video, a target rate ratio 8-1 determined by the electronic device based on the content of the video fluctuates from a 1× speed to a 4× speed at different times, so that the play rate of the adjusted video changes dynamically from 1× to 4× of an original play rate.

S104: Play the adjusted multimedia information.

When the multimedia information is a video, the electronic device displays the adjusted video in a play area. When the multimedia information is an audio, the electronic device can play the adjusted audio in the background, or play it in the play interface. At this moment, the play interface can display the lyrics, sound effect animation and the like of the audio. Since the adjusted multimedia information is adjusted according to the dynamic target rate ratio determined according to the specific content or the user's interest, the adjusted multimedia information can more highlight the specific content and the content that is important and of interest to the user, and the multimedia information play process is more in line with the user's preferences and habits, and is more intelligent.

It can be understood that the video play area is set in a third pre-set area of the play interface, where, the size and position of the third pre-set area can be set according to actual situation, for example, the third pre-set area is set in the center of the play interface with the size being 90% of that of the play interface, or the third pre-set area is set in the left half of the play interface with the size set to be 50% of that of the play interface.

Figure 9A:
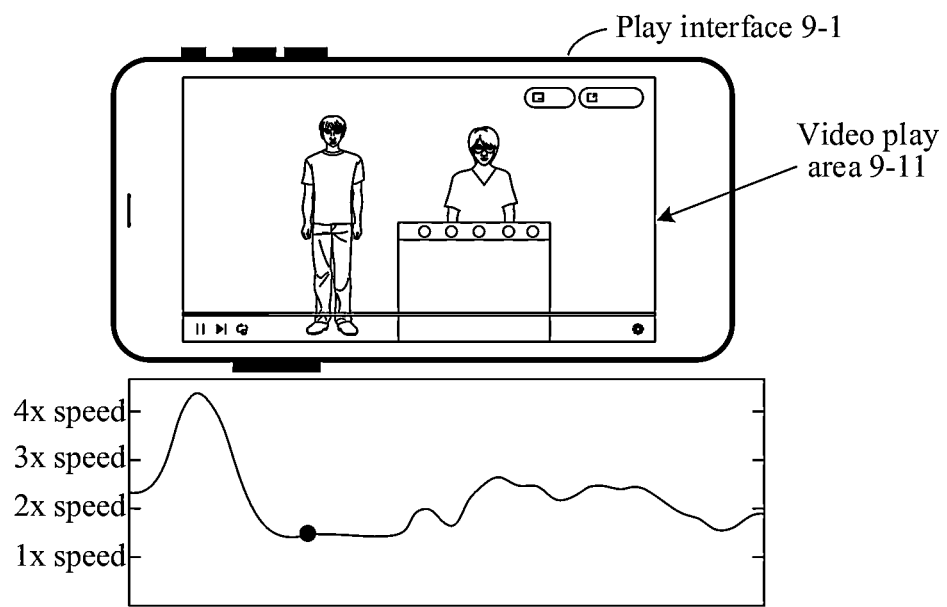
FIG. 9A is a schematic diagram 1 displaying adjusted multimedia information provided by an embodiment of this application.
Figure 9B:
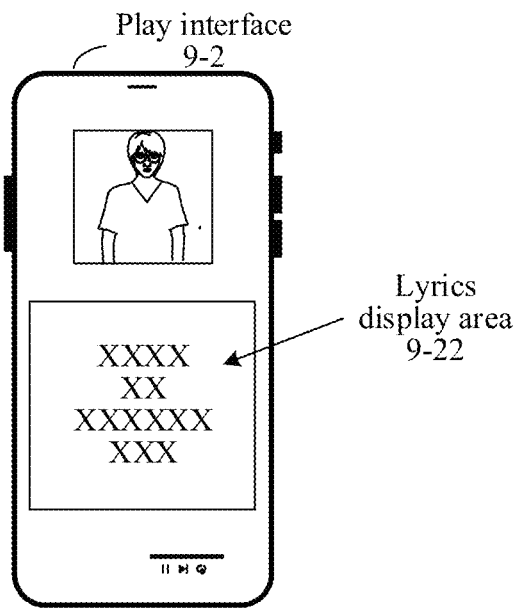
FIG. 9B is a schematic diagram 2 displaying adjusted multimedia information provided by an embodiment of this application.

In some embodiments, an embodiment of this application provides a schematic diagram 1 displaying the adjusted multimedia information. Referring to FIG. 9A, the multimedia information is a video, in a video play area 9-11 set on a play interface 9-1, the adjusted video is displayed, where, the play rate of the adjusted video changes from a 1× speed to a 4× speed of the original playback rate. As shown in FIG. 9B, an embodiment of this application provides a schematic diagram 2 displaying the adjusted multimedia information. When the multimedia information is a song, a lyrics display area 9-22 set in a play interface 9-2 displays corresponding lyrics at a play rate of the adjusted audio, and at the same time, the electronic device can play the adjusted audio through devices such as headphones. It can be understood that the audio can also be other audios, such as story audio, conversation recording and the like, and the electronic device can also dynamically adjust the play rate according to the rhythm and language density of a story or content of a conversation.

In this embodiment, when a play rate option of an intelligent selection option is triggered, the electronic device can analyze the content information of the multimedia information, determine the dynamic target rate ratio, and then use the target rate ratio to adjust the play rate of the multimedia information, so that the play rate of the multimedia information is dynamic and changeable, and the change is related to the content of the multimedia information, so that the control over the play rate of the multimedia information can be made more intelligent, and the effect of controlling play of the multimedia information is improved.

Figure 10:
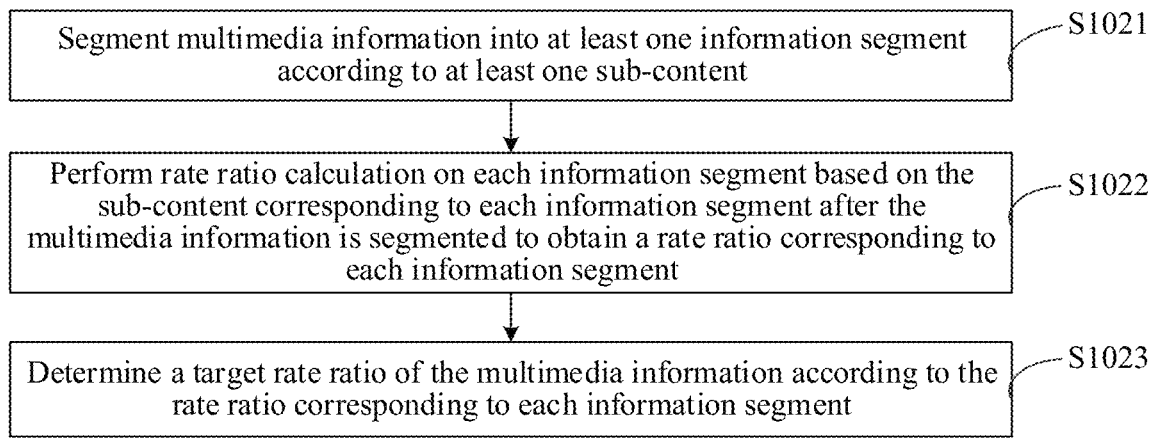
FIG. 10 is a schematic flowchart 2 of an information play control method provided by an embodiment of this application.

Referring to FIG. 10, FIG. 10 is a schematic flowchart 2 of an information play control method provided by an embodiment of this application. In some embodiments of this application, content of multimedia information includes at least one sub-content. In this case, a target rate ratio of the multimedia information is determined based on the content of the multimedia information, that is, the specific implementation process of S102 may include: S1021-S1023, which are as follows:

S1021: Segment the multimedia information into at least one information segment according to the at least one sub-content.

The sub-content in the content of the multimedia information refers to information that can distinguish one segment of the multimedia information from another segment. For example, a star, an actor's line, a segment of scenario and the like. Therefore, the electronic device can segment the multimedia information according to different sub-contents, to obtain information segments with the number same as the number of the sub-content. It is to be understood that the at least one sub-content and the at least one information segment are in one-to-one correspondence.

For example, the electronic device can segment a video into video segments one by one according to different actor's lines, and can also segment the video into video segments one by one according to different actors. In another example, the electronic device divides an audio into audio segments one by one according to lyrics, or divides the audio into audio segments one by one according to the comments and marked popularity of netizens.

S1022: Perform rate ratio calculation on each information segment based on the sub-content corresponding to each information segment after the multimedia information is segmented to obtain a rate ratio corresponding to each information segment.

After obtaining at least one information segment, the electronic device will analyze the sub-content corresponding to each information segment to determine whether each information segment contains specific content and whether it is of interest to the user, to determine whether each information segment needs to be accelerated or decelerated for play, and then a ratio of acceleration or deceleration is taken as the rate ratio corresponding to each information segment.

It is to be understood that, whether to accelerate or decelerate the information segment can be determined according to the magnitude relationship between the rate ratio and a pre-set value. For example, when the pre-set value is 1, in response to that the rate ratio is less than 1, it means that the information segment is to be decelerated, and in response to that the rate ratio is greater than 1, it means that the information segment is to be accelerated.

It can be understood that the specific content in this embodiment may be content specified by the user that needs to be watched carefully, or content that needs to be skipped, and further, the electronic device may determine the rate ratio according to the content type specified by the user. For example, when the user specifies to watch a certain star carefully, the information segment containing the star needs to be played at a normal speed or even played at a decreased speed. The electronic device determines the rate ratio according to the degree for carefully watching the star specified by the user.

In some embodiments, when the information segment includes content that is of interest to the user analyzed according to the user's portrait, the electronic device may determine the rate ratio according to the analyzed degree of interest of the user. For example, the rate ratio is confirmed to be 0.5 when it is of great interest, and the rate ratio is set to be 3 when it is of no interest.

S1023: Determine the target rate ratio of the multimedia information according to the rate ratio corresponding to each information segment.

After calculating the rate ratio corresponding to each information segment, the electronic device will rank the rate ratio of each information segment according to the order of the information segment, and a composed sequence is the target rate ratio of the multimedia information.

In some embodiments, when there are 3 information segments in the multimedia information with rate ratios of 0.5, 1 and 1.5, respectively, the target rate ratio can be expressed as [0.5, 1, 1.5].

In this embodiment, the electronic device can divide the multimedia information into information segments one by one according to different sub-contents in the content of the multimedia information, and then calculate the rate ratio corresponding to each information segment according to the sub-content corresponding to each information segment, to obtain the target rate ratio of the multimedia information, thus making the target rate ratio of the multimedia information changeable.

In some embodiments of this application, the sub-content corresponding to each information segment includes text information. At this moment, perform rate ratio calculation on each information segment, based on the sub-content corresponding to each information segment after the multimedia information is segmented, to obtain a rate ratio corresponding to each information segment, that is, the specific implementation process of S1022 may include: S201-S202, which are as follows:

S201: Calculate a display rate of the text information to obtain a text display rate.

When each information segment includes text information, in some embodiments, the electronic device will firstly count the number of characters in the text information of each information segment, then perform subtraction on display starting time and display ending time of the text information to obtain a time difference value, and finally obtain the text display rate of each information segment by a ratio of the number of characters to the time difference value.

It is to be understood that, when the sub-content includes the text information, the electronic device actually divides the multimedia information into different information segments according to continuous text information, so that the text display rate at any time within one information segment can be the same as the text display rate calculated based on the display starting time and the display ending time of the information segment. It can be understood that when there is no text information in the information segment, the text display rate of the information segment is 0.

In some embodiments, an embodiment of this application provides a formula for calculating the text display rate, referring to formula (1), which is as follows:

$$WordRate(t_s, t_e) = WordRate(T_s, T_e) = \frac{NumWords(T_s, T_e)}{T_e - T_s} \quad (1)$$

$T_s$ is time that display of the text information starts, $T_e$ is time that display of the text information ends, $t_s$ and $t_e$ are any time between $T_s$ and $T_e$, $NumWords(T_s, T_e)$ is the number of characters of the text information, $WordRate(T_s, T_e)$ is the text display rate, and $WordRate(t_s, t_e)$ is the text display rate at any time period in each information segment. After knowing values of the above parameters, the electronic device substitutes the values of these parameters into formula (1) to calculate the text display rate.

In some embodiments, Table 1 is an example of text display rates for some subtitles:

| Statement | Start Time (minute: second) | End Time (minute: second) | Content | Number of words | Duration | Rate (word number/ second) |
|---|---|---|---|---|---|---|
|  | 0 | 12:883 |  | 0 | 12.88 | 0.00 |
| 1 | 12:883 | 14:724 | When you have anything in the future | 8 | 1.84 | 4.35 |
|  | 14:724 | 15:604 |  | 0 | 0.88 | 0.00 |
| 2 | 15:604 | 17:284 | Tell me first | 6 | 1.68 | 3.57 |
|  | 17:284 | 18:244 |  | 0 | 0.96 | 0.00 |
| 3 | 18:244 | 19:924 | You cannot decide it on your own | 7 | 1.68 | 4.17 |

As can be seen from Table 1, the length of pauses in the subtitles "When you have anything in the future", "Tell me first" and "You cannot decide it on your own" all exceeds 0.5, as the several subtitles are defined as different statements, then the text display rate can be determined based on the number of words in these statements.

In some other embodiments, the electronic device may analyze the semantics of text information included in each information segment through the artificial intelligence technology, calculate the importance of the semantics, and then determine a text display rate for each information segment based on the importance of the semantics.

It can be understood that the text information may refer to subtitles in videos, bullet screen comments from netizens and the like, and may also be lyrics of audios and the like, and this embodiment of this application is not limited herein. Further, different text information is defined according to the pause time when the text information is displayed. For example, when the pause time between one session and another session in a subtitle exceeds a time threshold, the two pieces of text information are treated as two pieces of different text information, such as subtitles, bullet screen comments from netizens and the like.

S202: Use the text display rate, a pre-set text rate and a pre-set maximum rate ratio to calculate an adjustment ratio of each information segment to obtain a rate ratio corresponding to each information segment.

After obtaining the text display rate, the electronic device will obtain the pre-set text rate and the pre-set maximum rate ratio, and then calculate the rate adjustment ratio of each information segment according to the relationship among the three dimensions of the text display rate, the pre-set text rate and the pre-set maximum rate ratio, to obtain the rate ratio corresponding to each information segment.

In some embodiments of this application, the electronic device may fuse the text display rate and the pre-set text rate and subtract a fused rate ratio from the pre-set maximum rate ratio to obtain the rate ratio corresponding to each information segment. In some other embodiments of this application, the electronic device may use the text display rate and the pre-set maximum rate ratio to calculate a maximum display rate, and then uses a ratio between the maximum display rate and the pre-set text rate as the rate ratio.

In this embodiment, the electronic device can firstly calculate the text display rate of the text information included in the sub-content corresponding to each information segment, and then determine the rate ratio of each information segment based on the text display rate, to determine the rate ratio for each information segment according to the text information in each information segment.

In some embodiments of this application, use the text display rate, the pre-set text rate and the pre-set maximum rate ratio to calculate the adjustment ratio of each information segment to obtain the rate ratio corresponding to each information segment, that is, the specific implementation process of S202 may include: S2021-S2022, which are as follows:

S2021: Divide the text display rate by the pre-set text rate to obtain a rate ratio calculation factor.

S2022: Perform difference value calculation on the pre-set maximum rate ratio and the rate ratio calculation factor to obtain the rate ratio corresponding to each information segment.

The electronic device firstly takes the text display rate as a numerator and the pre-set text rate as a denominator to perform ratio calculation, and the obtained ratio is the rate ratio calculation factor. The electronic device then subtracts the rate ratio calculation factor from the pre-set maximum rate ratio, and the obtained difference value is the rate ratio corresponding to each information segment.

It can be understood that the pre-set text rate represents a speech rate baseline that does not require adjustment, i.e., the original rate of multimedia information. The pre-set text rate can be set according to an empirical value or actual requirements, for example, the pre-set text rate is set between 7-10 (i.e., 7-10 words are displayed per second), and can also be set as 5, and this embodiment of this application is not limited herein.

By the same reasoning, the pre-set maximum rate ratio is also set according to specific use scenarios, for example, can be set as 2 or 3. It is to be understood that, the rate ratio calculated by the electronic device of this embodiment of this application may be less than the pre-set maximum rate ratio.

In some embodiments, a calculation method of the rate ratio provided by this embodiment of this application is as shown in formula (2):

$$SpeedRate(t_s, t_e) = 2 - \left(\frac{WordRate(t_s, t_e)}{N}\right) \quad (2)$$

WordRate($t_s$, $t_e$) is the text display rate, N is the pre-set text rate, 2 is the pre-set maximum rate ratio, and SpeedRate ($t_s$, $t_e$) is the rate ratio of each information segment. It can be seen from formula (2), 1≤SpeedRate($t_s$, $t_e$)≤2.

In this embodiment, the electronic device firstly divides the text display rate by the pre-set text display rate to obtain the rate ratio calculation factor, and then the rate ratio of each information segment is calculated by combining the rate ratio calculation factor, the pre-set text rate and the pre-set maximum rate ratio, to determine the target rate ratio.

In some embodiments of this application, perform rate ratio calculation on each information segment, based on the sub-content corresponding to each information segment in at least one information segment, to obtain the rate ratio corresponding to each information segment, that is, the specific implementation process of S1022 may include: S203-S204, which are as follows:

S203: Extract a matched rate ratio of the sub-content corresponding to each information segment from a plurality of pre-set rate ratios.

The electronic device matches each sub content with the plurality of pre-set rate ratios, and in response to that the pre-set rate ratio set for each sub-content information is matched, the pre-set rate ratio is taken as the matched rate ratio.

It is to be understood that in this embodiment, the sub-content corresponding to each information segment at least includes any one or more of the following: object information, audio information and video semantic information.

S204: Determine the matched rate ratio as the rate ratio corresponding to each information segment.

The electronic device takes the extracted matched rate ratio as the rate ratio corresponding to each information segment, so that the electronic device can determine the corresponding rate ratio for each information segment.

In this embodiment, the electronic device can determine the rate ratio for each information segment according to the sub-content information contained in each information segment, and the target rate ratio is dynamic when the rate ratios of different information segments are different.

In some embodiments of this application, the sub-content corresponding to each information segment includes object information. Perform rate ratio calculation on each information segment, based on the sub-content corresponding to each information segment in at least one information segment, to obtain the target rate ratio corresponding to each information segment, that is, the specific implementation process of S1022 may include: S205-S206, which are as follows:

S205: Extract a pre-set rate ratio corresponding to the object information from a plurality of pre-set rate ratios.

S206: Determine the pre-set rate ratio corresponding to the object information as the rate ratio corresponding to each information segment.

In this embodiment, the plurality of pre-set rate ratios may also be pre-set, and each pre-set rate ratio may correspond to one type of sub-content information. When the sub-content information corresponding to each information segment is the object information, the electronic device can extract the pre-set rate ratio corresponding to the object information from the plurality of pre-set rate ratios according to the object information, and at this moment, the extracted pre-set rate ratio is the rate ratio corresponding to each information segment.

It can be understood that the object information may be information of characters, information of animals or even information of objects in the information segment. For example, when the object information is a certain famous actor, a pre-set rate ratio corresponding to the famous actor may be determined as the rate ratio of the information segment.

In this embodiment, the electronic device selects the pre-set rate ratio corresponding to the object information from the plurality of pre-set rate ratios according to the object information included in the sub-content information as the rate ratio corresponding to each information segment, so that the electronic device can determine the rate ratio for each information segment based on the image dimension.

In some embodiments of this application, the sub-content corresponding to each information segment includes audio information. Perform rate ratio calculation on each information segment, based on the sub-content corresponding to each information segment in at least one information segment, to obtain the rate ratio corresponding to each information segment, that is, the specific implementation process of S1022 may include: S207-S209, which are as follows:

S207: Identify an audio beat from the audio information.

The electronic device identifies the melody beat of the audio information to obtain the audio beat of the audio information, namely, obtains the audio beat of each information segment.

It can be understood that the electronic device may utilize a speech recognition function to recognize a name corresponding to the audio information and then search for the audio beat on the Internet according to the name. The electronic device can also compare the melody in the audio information with the melody in the Internet song library, to directly search for a matched melody, and take the beat of the melody as the audio beat of each information segment.

S208: Extract a pre-set rate ratio corresponding to the audio beat from a plurality of pre-set rate ratios.

S209: Use the pre-set rate ratio corresponding to the audio beat as the rate ratio corresponding to each information segment.

After obtaining the audio beat of each information segment, the electronic device will extract the pre-set rate ratio corresponding to the audio beat from the plurality of pre-set rate ratios, and take the extracted rate ratio as the rate ratio corresponding to each information segment.

In some embodiments, when the electronic device recognizes that the audio information is a certain children's song, it may take the melody beat of the children's song as the audio beat of the information segment and then select a pre-set rate ratio corresponding to the children's song from the plurality of pre-set rate ratios, for example, a selected ratio of acceleration is 2 and this ratio is taken as the rate ratio for each information segment.

In this embodiment, when the sub-content information of each information segment includes audio information, the electronic device may firstly identify the audio beat of the audio information, then extract a pre-set rate ratio corresponding to the audio beat, and take the extracted rate ratio as the rate ratio of the information segment, to determine the rate ratio for each information segment based on the audio dimension.

In some embodiments of this application, the sub-content corresponding to each information segment includes video semantic information. At this moment, perform rate ratio calculation on each information segment, based on the sub-content corresponding to each information segment in at least one information segment, to obtain the rate ratio corresponding to each information segment, that is, the specific implementation process of S1022 may include: S2010-S2011, which are as follows:

S2010: Extract a pre-set rate ratio corresponding to the video semantic information from a plurality of pre-set rate ratios.

S2011: Take the pre-set rate ratio corresponding to the video semantic information as the rate ratio corresponding to each information segment.

The electronic device extracts the pre-set rate ratio corresponding to the video semantic information from the plurality of pre-set rate ratios according to the video semantic information, and takes the extracted pre-set rate ratio as the rate ratio corresponding to each information segment.

In some embodiments, when the video semantic information indicates that the scenario of the information segment is "identify bad guys for who they are", the rate ratio of the scenario can be extracted from the plurality of pre-set rate ratios, for example, 1 is extracted, so that the rate ratio is taken as the rate ratio of the information segment.

It is to be understood that in this embodiment, the video semantic information can be identified through a video understanding algorithm. The video semantic information may refer to the scenario of the video, and may also refer to interaction of various characters in the video, the scene of the video and the like, and this application is not limited herein.

In this embodiment, the electronic device can determine the rate ratio for each information segment based on the video semantic information, thereby being capable of determining the rate ratio for the information segment based on the dimension of the video semantics.

In some embodiments of this application, the multimedia information includes at least one information segment, and the target rate ratio includes the rate ratio corresponding to each information segment. Use the target rate ratio to adjust the play rate of the multimedia information to obtain the adjusted multimedia information, that is, the specific implementation process of S103 may include: S1031-S1032, which are as follows:

S1031: Adjust the play rate of each information segment according to the rate ratio corresponding to each information segment to obtain an adjusted information segment corresponding to each information segment.

In response to performing play control on the multimedia information, the electronic device extracts the rate ratio corresponding to each information segment from the target rate ratio, and then adjusts the play rate for each information segment according to the corresponding rate ratio, so that the play rate of each information segment is increased or decreased, to obtain the adjusted information segment corresponding to each information segment.

S1032: Use the adjusted information segment corresponding to each information segment to splice the adjusted multimedia information.

Then, the electronic device splices all the adjusted information segments together according to the order of the information segments, so that the multimedia information obtained after splicing is the adjusted multimedia information.

In this embodiment, the electronic device can adjust the play rate of each information segment according to the rate ratio corresponding to each information segment, and finally use the adjusted information segment to compose the adjusted multimedia information, thus realizing dynamic adjustment of the play rate of the multimedia information.

In some embodiments of this application, after performing rate ratio calculation on each information segment, based on the sub-content corresponding to each information segment after the multimedia information is segmented, to obtain the rate ratio corresponding to each information segment, that is, after S1022, the method may further include: S1024, which is as follows:

S1024: Perform smoothing processing on the rate ratio corresponding to each information segment to obtain a smoothed rate ratio corresponding to each information segment.

The difference between the rate ratios of each information segment calculated by the electronic device may be large, leading to sudden changes in the play rate, which causes discomfort to the user. Accordingly, in this embodiment, after calculating the rate ratio corresponding to each information segment, the electronic device will continue to perform smoothing processing on the rate ratio corresponding to each information segment, to obtain the smoothed rate ratio corresponding to each information segment.

Figure 11:
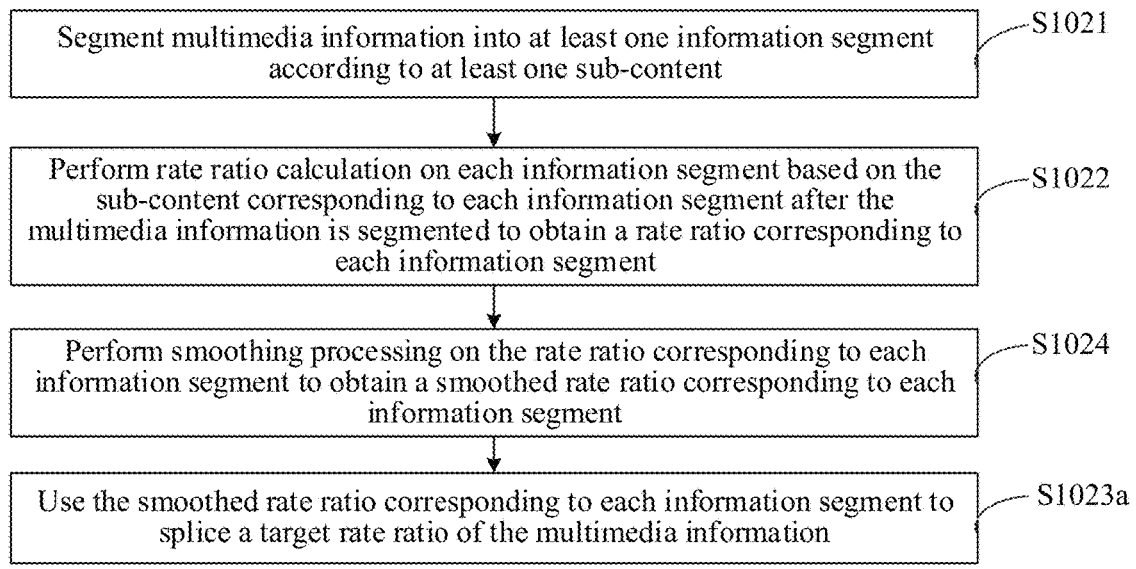
FIG. 11 is a schematic flowchart 3 of an information play control method provided by an embodiment of this application.

Further, referring to FIG. 11, FIG. 11 is a schematic flowchart 3 of an information play control method provided by an embodiment of this application. In some embodiments of this application, after performing smoothing processing on the rate ratio corresponding to each information segment to obtain the smoothed rate ratio corresponding to each information segment, that is, after S1024, the method may further include: S1023*a*, which is as follows:

S1023*a*: Use the smoothed rate ratio corresponding to each information segment to splice the target rate ratio of the multimedia information.

In this way, the target rate ratio of the multimedia information can be made to change more smoothly, so that play of the multimedia information does not have a sudden speed change which affects the multimedia information control effect.

Figure 12:
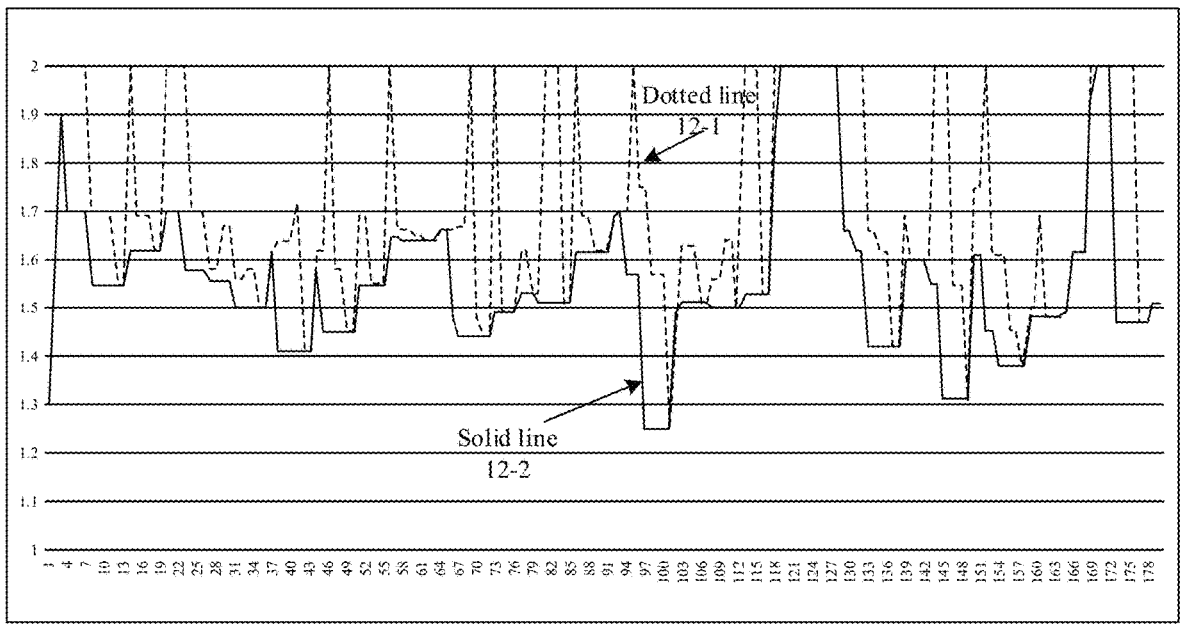
FIG. 12 is an effect diagram of smoothing processing provided by an embodiment of this application.

In some embodiments, an embodiment of this application provides an effect diagram of smoothing processing. Referring to FIG. 12, a horizontal axis is time (ranging from 0-178 s), a vertical axis is the rate ratio (ranging from 1-2), and a dotted line 12-1 is a target rate ratio obtained without the smoothing processing. As can be seen, a lot of spikes are caused due to the sudden change of rates among different information segments, which will affect the user's experience in playing of the multimedia information. A solid line 12-2 is the target rate ratio obtained after the smoothing processing, and it can be seen that spikes of the solid line 12-2 are less than those of the dashed line, i.e., the target rate ratio obtained without the smoothing processing, and the playing is smoother in effect, thereby improving the playing effect.

In this embodiment, the electronic device can also perform smoothing processing on the rate ratio corresponding to each information segment to obtain a smoothed rate ratio, and then use the smoothed rate ratio to compose the target rate ratio of the multimedia information, so that the target rate ratio does not have a sudden change, and the playing effect is improved.

In some embodiments of this application, each information segment is actually composed of smaller time periods one by one, i.e., each information segment includes a plurality of time periods, so that the rate ratio of each information segment includes sub-rate ratios respectively corresponding to various time periods in each information segment. In this case, perform smoothing processing on the rate ratio corresponding to each information segment to obtain the smoothed rate ratio corresponding to each information segment, that is, the specific implementation process of S1024 may include: S301-S305, which are as follows:

S301: Perform difference value calculation on the rate ratio corresponding to each information segment and the rate ratio corresponding to a previous information segment of each information segment to obtain a rate ratio difference value.

Before performing smoothing processing on each information segment, the electronic device firstly needs to know what the difference value between the rate ratio of each information segment and the rate ratio of a corresponding previous information segment of each information segment is, to determine how to perform smoothing. Thus, the electronic device may firstly subtract the rate ratio corresponding to the previous information segment from the rate ratio corresponding to each information segment to obtain the rate ratio difference value between each information segment and the corresponding previous information segment of each information segment.

S302: Divide the rate ratio difference value by the number of time periods to obtain a rate ratio change amplitude for each time period of the various time periods.

The number of time periods represents the number of time periods within each information segment.

Since each information segment is composed of smaller time periods one by one, for example, a 1-minute information segment can be considered to be composed of small information segments corresponding to six 10-second time periods, and smoothing processing can be realized based on apportioning the rate ratio difference value to the various time periods corresponding to each information segment, so that the rate ratio within each information segment is gradually adjusted, rather than suddenly changed, to avoid user's discomfort. Thus, in this embodiment, divide the rate ratio difference value by the total number of the time periods in the information segment through the electronic device, to obtain the change amplitude of the rate ratio that is to be undertaken by each time period in the information segment.

It can be understood that a value of the time period can be 10 s, and can also be 1 s, and can also be other values set according to specific use scenarios, and this embodiment of this application is not limited herein.

In some embodiments, when a difference value of rate ratios of a 5 s information segment and a previous information segment thereof is 2, the change amplitude of the rate ratio per second in the information segment is 0.4, i.e. the rate ratio increases from the rate ratio of the previous information segment to the rate ratio of the information segment at a 0.4 width.

S303: Use a sub-rate ratio of the previous time period of each time period and the rate ratio change amplitude of each time period to calculate a sub-rate ratio of each time period.

In some embodiments, the electronic device may add the sub-rate ratio of the previous time period and the rate ratio change amplitude of each time period to obtain the sub-rate ratio of each time period. In some other embodiments, the electronic device may average the rate ratio change amplitude of each time period, and add the average based on the sub-rate ratio for the previous time period to obtain the sub-rate ratio of each time period.

S304: When calculation of the sub-rate ratio is completed for various time periods, obtain sub-rate ratios corresponding to the various time periods in each information segment.

When the electronic device completes the calculation of the sub-rate ratio for all the time periods, the sub-rate ratios of the various time periods can be obtained, i.e., apportioning of the rate ratio difference value is completed.

It is to be understood that, when a certain time period is the first time period in the information segment, the sub-rate ratio of the previous time period thereof is substantially equal to the rate ratio of the previous information segment.

S305: Use the sub-rate ratios respectively corresponding to the various time periods to splice the smoothed rate ratio corresponding to each information segment.

Finally, the electronic device concentrates the sub-rate ratios of the various time periods together in the order of the time periods, and an obtained set is the smoothed rate ratio of each information segment.

In this embodiment, the electronic device can calculate the rate ratio of each information segment and the rate ratio of the corresponding previous information segment thereof, and then apportion the rate ratio difference value in the various time periods of each information segment, so that the rate ratio can be gradually adjusted, rather than suddenly changed, to avoid the user's discomfort caused by the sudden change of the play rate and improve the play control effect.

In some embodiments of this application, divide the rate ratio difference value by the number of the time periods to obtain the rate ratio change amplitude of each time period in the various time periods, that is, the specific implementation process of S302, may include: S3021 or S3022, which are as follows:

S3021: When the ratio of the rate ratio difference value to the number of the time periods is less than or equal to a pre-set change amplitude, the ratio of the rate ratio difference value to the number of the time periods is determined as the rate ratio change amplitude of each time period.

In this embodiment, a certain condition may also be set for the rate ratio change amplitude, for example, in order to avoid that the sub-rate ratio of the time period within the information segment changes too fast, a condition that a speed increase is not to be greater than a certain threshold may be set for the sub-rate ratio, and accordingly, after calculating the ratio of the rate ratio difference value to the number of the time periods, the electronic device firstly needs to compare the ratio with a pre-set change amplitude, and when the ratio is less than or equal to the pre-set change amplitude, the ratio is taken as the rate ratio change amplitude.

It can be understood that the pre-set change amplitude can be set to be 0.3, and can also be set to be 0.5, and can also be set to be other values according to actual requirements, and this application is not limited herein.

S3022: When the ratio of the rate ratio difference value to the number of the time periods is greater than the pre-set change amplitude, determine the pre-set change amplitude as the rate ratio change amplitude of each time period.

When the calculated ratio of the rate ratio difference value to the number of the time periods is greater than the pre-set change amplitude, the electronic device will directly take the pre-set change amplitude as the rate ratio change amplitude of each time period, thereby avoiding that the rate ratio change amplitude of each time period is too large.

In this embodiment, the electronic device can compare the ratio of the rate ratio difference value to the number of the time periods with the pre-set change amplitude, thereby determining the rate ratio change amplitude of each time period, to avoid that the rate ratio change amplitude of each time period is too large.

In some embodiments of this application, use the sub-rate ratio of the previous time period of each time period and the rate ratio change amplitude of each time period to calculate the sub-rate ratio of each time period, that is, the specific implementation process of S303 may include: S3031-S3034, which are as follows:

S3031: Sum the sub-rate ratio of the previous time period of each time period and the rate ratio change amplitude of each time period to obtain a sum value result.

S3032: Extract a pre-set number of associated time periods for each time period.

S3033: Extract a maximum associated sub-rate ratio from the sub-rate ratios respectively corresponding to the pre-set number of associated time periods.

The electronic device extracts the pre-set number of associated time periods for each time period according to an associated time period selection strategy, and extracts the sub-rate ratio corresponding to each of the associated time periods to serve as an associated sub-rate ratio of each time period, so the electronic device can obtain a pre-set number of associated sub-rate ratios. The electronic device compares the pre-set number of associated sub-rate ratios with each other to determine the maximum associated sub-rate ratio, and extracts the maximum associated sub-rate ratio.

It is to be understood that, the associated time period selection strategy may refer to selecting adjacent time periods previous and subsequent to each time period, for example, 2 previous time periods and 2 subsequent time periods of each time period, or it may also refer to selecting only a plurality of time periods subsequent to each time period, for example, the 5 subsequent time periods of each time period. Of course, the associated time period selection strategy can also be set as other strategies according to actual requirements, and this application is not limited herein.

It can be understood that the pre-set number can be set according to specific use scenarios, for example, set as 5, set as 10, and the like, and this application is not limited herein.

S3034: When the sum value result is less than or equal to the maximum associated sub-rate ratio, determine the sum value result as the sub-rate ratio of each time period.

The electronic device compares the maximum associated sub-rate ratio and the previously calculated sum value result. When the sum value result is less than or equal to the maximum associated sub-rate ratio, the electronic device takes the sum value result as the sub-rate ratio corresponding to each time period, thereby avoiding that the sub-rate ratio of each time period is too large and causing discomfort to the user.

In some embodiments of this application, when the sum value result is greater than the maximum associated sub-rate ratio, the electronic device may take the maximum associated sub-rate ratio as the sub-rate ratio of each time period to avoid that the sub-rate ratio of each time period is too large.

In this embodiment, the electronic device can firstly extract the maximum associated sub-rate ratio for the sub-rate ratio corresponding to each time period, and then compare the sum value of the sub-rate ratio of the previous time period of each time period and the rate ratio change amplitude of each time period with the maximum associated sub-rate ratio, to determine whether the sum value result can be taken as the sub-rate ratio of each time period to avoid that the sub-rate ratio of each time period is too large.

The following describes an exemplary application of this embodiment of this application in an actual application scenario.

This embodiment of this application is realized in a scene of intelligently accelerating a video played by a video playing application. A terminal (electronic device) can use video content information (content of the multimedia information), mainly the time period of occurrence of the specific content, for example, actor's line information (text information) refers to the time range of occurrence of each actor's line, character information (object information) refers to the time period of occurrence of each character, and so on.

This embodiment of this application illustrates the process of intelligent acceleration by taking the actor's line as an example. The source of actor's line information may be a soft caption, OCR, speech to text and the like.

Firstly, the terminal calculates the speech rate (text display rate) of the actor's line in each segment of video (information segment). The terminal may use formula (1) to calculate the speech rate, and the speech rate is 0 in the absence of the actor's line.

Then, the terminal gives a relatively large acceleration ratio (rate ratio) for the case where no actor's line exists or the actor's line is slow, and the acceleration ratio can be calculated according to formula (2). In general, the acceleration ratio is limited to 1-2 times.

Finally, since the calculated acceleration ratio of each segment of video has a large difference, a sudden change in the acceleration ratio will cause a sudden change in the play speed, thus bringing discomfort to the user; therefore, the terminal needs to use a smoothing strategy to make the play speed change more naturally. The terminal can calculate a smoothed rate (a smoothed rate ratio corresponding to each video segment) on the basis of the original rate (a rate ratio of each video segment), and apply the following strategy:

1. the smoothed rate is not higher than the highest rate (the maximum associated sub-rate ratio) of the last five seconds (the pre-set number of associated time periods); and
2. the increase in the smoothed rate per second (the ratio of the rate ratio difference value to the number of the time periods) is not more than 0.3 (the pre-set change amplitude).

Using the smoothing strategy, the terminal is able to avoid severe acceleration and deceleration, so that the play remains smooth.

The acceleration and multiplied speed of the video can be calculated in real time in response to that the terminal reads actor's line data, or can be processed off-line in advance, that is to say, a server determines the multiplied speed for each video segment and sends the video segment to the terminal, and the video segment can be read and played in the terminal.

So far, intelligent acceleration according to actor's lines is accomplished.

For some other scenes, intelligent acceleration can be carried out according to the following strategies, for example, scenes with star appearance can be set with a fixed acceleration ratio (extract the pre-set rate ratio corresponding to the object information to serve as the rate ratio corresponding to each video segment); scenes with music can be intelligently accelerated by matching the beat (use the pre-set rate ratio corresponding to the audio beat of the audio information as the rate ratio corresponding to each video segment); and each scene can be matched with a specific rate based on semantics (video semantic information) (take the pre-set rate ratio corresponding to the video semantic information as the rate ratio corresponding to each video segment).

Applying the above methods, it is possible to calculate appropriate acceleration ratios based on the video content when the video is played by the video play application, to change the video acceleration from a regular fixed acceleration to a dynamically adjusted acceleration, which thereby can improve the effect of play control over the video and enhance user's experience.

The following continues to describe the exemplary structure of the information play control apparatus 455 provided by this embodiment of this application implemented as a software module, in some embodiments, as shown in FIG. 5, the software module stored in the information play control apparatus 455 of the memory 450 may include:

an information displaying module 4551, configured to display play rate options in response to a triggering operation for a rate control identifier of a play interface; the play rate options including an smart adjustment option, the smart adjustment option being used for triggering dynamic rate adjustment for multimedia information;

a rate ratio determining module 4552, configured to determine a target rate ratio of the multimedia information based on content of the multimedia information in response to a triggering operation for the smart adjustment option; the target rate ratio being dynamic;

a rate adjusting module 4553, configured to use the target rate ratio to adjust a play rate of the multimedia information to obtain adjusted multimedia information; and the information displaying module 4551, further configured to play the adjusted multimedia information.

In some embodiments of this application, the content of the multimedia information includes at least one sub-content; the rate ratio determining module 4552 is further configured to segment the multimedia information into at least one information segment according to the at least one sub content; perform rate ratio calculation on each information segment, based on the sub-content corresponding to each information segment after the multimedia information is segmented, to obtain a rate ratio corresponding to each information segment; and determine the target rate ratio of the multimedia information according to the rate ratio corresponding to each information segment.

In some embodiments of this application, the sub-content corresponding to each information segment includes: text information; the rate ratio determining module 4552 is further configured to calculate a display rate of the text information to obtain a text display rate; and use the text display rate, a pre-set text rate and a pre-set maximum rate ratio to calculate an adjustment ratio for each information segment to obtain the rate ratio corresponding to each information segment.

In some embodiments of this application, the rate ratio determining module 4552 is further configured to divide the text display rate by the pre-set text rate to obtain a rate ratio calculation factor; and perform difference value calculation on the pre-set maximum rate ratio and the rate ratio calculation factor to obtain the rate ratio corresponding to each information segment.

In some embodiments of this application, the rate ratio determining module 4552 is further configured to extract a matched rate ratio of the sub-content corresponding to each information segment from a plurality of pre-set rate ratios; and determine the matched rate ratio as the rate ratio corresponding to each information segment.

In some embodiments of this application, the sub-content corresponding to each information segment includes: object information; the rate ratio determining module 4552 is further configured to extract a pre-set rate ratio corresponding to the object information from the plurality of pre-set rate ratios; and take the pre-set rate ratio corresponding to the object information as the rate ratio corresponding to each information segment.

In some embodiments of this application, the rate ratio determining module 4552 is further configured to extract a matched rate ratio matched with the sub-content corresponding to each information segment in the at least one information segment from the plurality of pre-set rate ratios; and take the matched rate ratio as the rate ratio corresponding to each information segment.

In some embodiments of this application, the sub-content information corresponding to each information segment includes: audio information; the rate ratio determining module 4552 is further configured to identify an audio beat from the audio information; extract a pre-set rate ratio corresponding to the audio beat from the plurality of pre-set rate ratios; and take the pre-set rate ratio corresponding to the audio beat as the rate ratio corresponding to each information segment.

In some embodiments of this application, the sub-content information corresponding to each information segment includes: video semantic information; the rate ratio determining module 4552 is further configured to extract a pre-set rate ratio corresponding to the video semantic information from the plurality of pre-set rate ratios; and take the pre-set rate ratio corresponding to the video semantic information as the rate ratio corresponding to each information segment.

In some embodiments of this application, the multimedia information includes at least one information segment, and the target rate ratio includes a rate ratio corresponding to each information segment; the rate adjusting module 4553 is further configured to adjust the play rate of each information segment according to the rate ratio corresponding to each information segment to obtain an adjusted information segment corresponding to each information segment; and use the adjusted information segment corresponding to each information segment to splice the adjusted multimedia information.

In some embodiments of this application, the rate ratio determining module 4552 is further configured to perform smoothing processing on the rate ratio corresponding to each information segment to obtain a smoothed rate ratio corresponding to each information segment.

In some embodiments of this application, the rate ratio determining module 4552 is further configured to use the smoothed rate ratio corresponding to each information segment to splice the target rate ratio of the multimedia information.

In some embodiments of this application, the rate ratio of each information segment includes sub-rate ratios respectively corresponding to various time periods in each information segment; the rate ratio determining module 4552 is further configured to perform difference value calculation on the rate ratio corresponding to each information segment and the rate ratio corresponding to a previous information segment of each information segment to obtain a rate ratio difference value; divide the rate ratio difference value by the number of time periods to obtain a rate ratio change amplitude of each time period in the various time periods; the number of the time periods representing the number of time periods within each information segment; use a sub-rate ratio of the previous time period of each time period and the rate ratio change amplitude of each time period to calculate a sub-rate ratio of each time period; obtain the sub-rate ratios respectively corresponding to the various time periods in each information segment in response to completing the calculation of the sub-rate ratio for the various time period; and use the sub-rate ratios respectively corresponding to the various time periods to splice the smooth rate ratio corresponding to each information segment.

In some embodiments of this application, the rate ratio determining module 4552 is further configured to determine the ratio of the rate ratio difference value to the number of the time periods as the rate ratio change amplitude of each time period when the ratio of the rate ratio difference value to the number of the time periods is less than or equal to a pre-set change amplitude; and determine the pre-set change amplitude as the rate ratio change amplitude of each time period when the ratio of the rate ratio difference value to the number of the time periods is greater than the pre-set change amplitude.

In some embodiments of this application, the rate ratio determining module 4552 is further configured to sum the sub-rate ratio of the previous time period of each time period and the rate ratio change amplitude of each time period to obtain a sum value result; extract a pre-set number of associated time periods for each time period; extract a maximum associated sub-rate ratio from sub-rate ratios respectively corresponding to the pre-set number of associated time periods; and determine the sum value result as the sub-rate ratio of each time period when the sum value result is less than or equal to the maximum associated sub-rate ratio.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

It is to be understood that the description of a picture searching apparatus provided by an embodiment of this application is similar to the description of a picture searching method provided by an embodiment of this application, and has similar beneficial effects.

According to an aspect of the embodiments of this application, a computer program product or a computer program is provided, including computer instructions, the computer instructions being stored in a computer-readable storage medium. A processor of a computer device (an electronic device for information play control) reads the computer instructions from the computer-readable storage medium, and executes the computer instructions, to cause the computer device to perform the information play control method in the embodiments of this application described above.

An embodiment of this application further provides a computer-readable storage medium, storing executable instructions, the executable instructions, when executed by a processor, causing the processor to perform the information play control method provided in the embodiments of this application, for example, the method shown in FIG. 6.

In some embodiments, the computer-readable storage medium may be a memory such as an FRAM, a ROM, a PROM, an EPROM, an EEPROM, a flash memory, a magnetic surface memory, an optical disk, or a CD-ROM; or may be any device including one of or any combination of the foregoing memories.

In some embodiments, the executable information play control instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable information play control instructions may, but do not necessarily, correspond to a file in a file system, and may be stored in a part of a file that saves another program or other data, for example, be stored in one or more scripts in a Hypertext Markup Language (HTML) file, stored in a file that is specially used for a program in discussion, or stored in the plurality of collaborative files (for example, be stored in files of one or modules, subprograms, or code parts).

In an example, the information play control executable instructions may be deployed to be executed on a computing device (an electronic device), or deployed to be executed on a plurality of computing devices at the same location, or deployed to be executed on a plurality of computing devices that are distributed in a plurality of locations and interconnected by using a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. An information play control method, the method being executed by an electronic device, comprising:
displaying play rate options in response to a triggering operation for a rate control identifier of a play interface, the play rate options comprising a smart adjustment option, the smart adjustment option being used for triggering play rate adjustment for multimedia information;
determining a target rate ratio of the multimedia information based on content of the multimedia information in response to a triggering operation for the smart adjustment option, comprising:
segmenting the multimedia information into at least one information segment according to at least one sub-content in the content of the multimedia information;
performing rate ratio calculation on the at least one information segment, based on the at least one sub-content corresponding to the at least one information segment, to obtain at least one rate ratio corresponding to the at least one information segment; and
determining the target rate ratio of the multimedia information according to the at least one rate ratio corresponding to the at least one information segment;
adjusting a play rate of the multimedia information based on the target rate ratio to obtain adjusted multimedia information; and
playing the adjusted multimedia information.

2. The method according to claim 1, wherein, the at least one sub-content corresponding to the at least one information segment comprises: text information; the performing rate ratio calculation on the at least one information segment, based on the sub-content corresponding to the at least one information segment, to obtain a rate ratio corresponding to each information segment comprises:
calculating a display rate of the text information to obtain a text display rate; and
using the text display rate, a text rate and a maximum rate ratio to calculate an adjustment ratio for each information segment of the at least one information segment to obtain the rate ratio corresponding to each information segment.

3. The method according to claim 2, wherein, the using the text display rate, a text rate and a maximum rate ratio to calculate an adjustment ratio for each information segment to obtain the rate ratio corresponding to each information segment comprises:
dividing the text display rate by the text rate to obtain a rate ratio calculation factor; and
performing difference value calculation on the maximum rate ratio and the rate ratio calculation factor to obtain the rate ratio corresponding to each information segment.

4. The method according to claim 1, wherein, the performing rate ratio calculation on the at least one information segment, based on the at least one sub-content corresponding to the at least one information segment, to obtain at least one rate ratio corresponding to the at least one information segment comprises:
extracting a matched rate ratio of the sub-content corresponding to each information segment of the at least one information segment from a plurality of rate ratios; and
determining the matched rate ratio as the rate ratio corresponding to each information segment.

5. The method according to claim 4, wherein, the at least one sub-content corresponding to the at least one information segment comprises any one or more of the following: object information, audio information and video semantic information.

6. The method according to claim 1, wherein, the target rate ratio comprises the rate ratio corresponding to each information segment of the at least one information segment;
the using the target rate ratio to adjust a play rate of the multimedia information to obtain adjusted multimedia information comprises:
adjusting a play rate of each information segment, according to the rate ratio corresponding to each information segment, to obtain an adjusted information segment corresponding to each information segment; and
using the adjusted information segment corresponding to each information segment to splice the adjusted multimedia information.

7. The method according to claim 1, wherein the method further comprises:
performing smoothing processing on the rate ratio corresponding to each information segment of the at least one information segment to obtain a smoothed rate ratio corresponding to each information segment.

8. The method according to claim 7, wherein the method further comprises:
using the smoothed rate ratio corresponding to each information segment to splice the target rate ratio of the multimedia information.

9. The method according to claim 7, wherein, the rate ratio of each information segment comprises sub-rate ratios respectively corresponding to various time periods in each information segment; the performing smoothing processing on the rate ratio corresponding to each information segment to obtain a smoothed rate ratio corresponding to each information segment comprises:
performing difference value calculation on the rate ratio corresponding to each information segment and a rate ratio corresponding to a previous information segment of each information segment to obtain a rate ratio difference value;
dividing the rate ratio difference value by the number of time periods to obtain a rate ratio change amplitude of each time period in the various time periods, the number of the time periods representing the number of time periods within each information segment;
using a sub-rate ratio of the previous time period of each time period and the rate ratio change amplitude of each time period to calculate a sub-rate ratio of each time period;
obtaining the sub-rate ratios respectively corresponding to the various time periods in each information segment in response to completing the calculation of the sub-rate ratio for the various time period; and
using the sub-rate ratios respectively corresponding to the various time periods to splice the smooth rate ratio corresponding to each information segment.

10. The method according to claim 9, wherein, the dividing the rate ratio difference value by the number of time periods to obtain a rate ratio change amplitude of each time period in the various time periods comprises:
determining a ratio of the rate ratio difference value to the number of the time periods as the rate ratio change amplitude of each time period when the ratio of the rate ratio difference value to the number of the time periods is less than or equal to a change amplitude; and
determining the change amplitude as the rate ratio change amplitude of each time period when the ratio of the rate ratio difference value to the number of the time periods is greater than the change amplitude.

11. The method according to claim 9, wherein, the using a sub-rate ratio of the previous time period of each time period and the rate ratio change amplitude of each time period to calculate a sub-rate ratio of each time period comprises:
summing the sub-rate ratio of the previous time period of each time period and the rate ratio change amplitude of each time period to obtain a sum value result;
extracting a number of associated time periods for each time period;
extracting a maximum associated sub-rate ratio from sub-rate ratios respectively corresponding to the number of associated time periods; and
determining the sum value result as the sub-rate ratio of each time period when the sum value result is less than or equal to the maximum associated sub-rate ratio.

12. An electronic device for information play control, comprising:
a memory, configured to store executable information instructions; and
a processor, when executing the executable instructions stored in the memory, configured to perform the information play control method comprising:
displaying play rate options in response to a triggering operation for a rate control identifier of a play interface, the play rate options comprising a smart adjustment option, the smart adjustment option being used for triggering play rate adjustment for multimedia information;
determining a target rate ratio of the multimedia information based on content of the multimedia information in response to a triggering operation for the smart adjustment option, comprising:

segmenting the multimedia information into at least one information segment according to at least one sub-content in the content of the multimedia information;

performing rate ratio calculation on the at least one information segment, based on the at least one sub-content corresponding to the at least one information segment, to obtain at least one rate ratio corresponding to the at least one information segment; and determining the target rate ratio of the multimedia information according to the at least one rate ratio corresponding to the at least one information segment;

adjusting a play rate of the multimedia information based on the target rate ratio to obtain adjusted multimedia information; and playing the adjusted multimedia information.

13. The electronic device according to claim 12, wherein, the at least one sub-content corresponding to the at least one information segment comprises: text information; the performing rate ratio calculation on the at least one information segment, based on the sub-content corresponding to the at least one information segment, to obtain a rate ratio corresponding to each information segment comprises:

calculating a display rate of the text information to obtain a text display rate; and using the text display rate, a text rate and a maximum rate ratio to calculate an adjustment ratio for each information segment of the at least one information segment to obtain the rate ratio corresponding to each information segment.

14. The electronic device according to claim 13, wherein, the using the text display rate, a text rate and a maximum rate ratio to calculate an adjustment ratio for each information segment to obtain the rate ratio corresponding to each information segment comprises:

dividing the text display rate by the text rate to obtain a rate ratio calculation factor; and performing difference value calculation on the maximum rate ratio and the rate ratio calculation factor to obtain the rate ratio corresponding to each information segment.

15. The electronic device according to claim 12, wherein, the performing rate ratio calculation on the at least one information segment, based on the at least one sub-content corresponding to the at least one information segment, to obtain at least one rate ratio corresponding to the at least one information segment comprises:

extracting a matched rate ratio of the sub-content corresponding to each information segment of the at least one information segment from a plurality of rate ratios; and determining the matched rate ratio as the rate ratio corresponding to each information segment.

16. A non-transitory computer-readable storage medium, storing executable instructions, the executable instructions, when executed by a processor, implementing an information play control method comprising:

displaying play rate options in response to a triggering operation for a rate control identifier of a play interface, the play rate options comprising a smart adjustment option, the smart adjustment option being used for triggering play rate adjustment for multimedia information;

determining a target rate ratio of the multimedia information based on content of the multimedia information in response to a triggering operation for the smart adjustment option, comprising:

segmenting the multimedia information into at least one information segment according to at least one sub-content in the content of the multimedia information;

performing rate ratio calculation on the at least one information segment, based on the at least one sub-content corresponding to the at least one information segment, to obtain at least one rate ratio corresponding to the at least one information segment; and determining the target rate ratio of the multimedia information according to the at least one rate ratio corresponding to the at least one information segment;

adjusting a play rate of the multimedia information based on the target rate ratio to obtain adjusted multimedia information; and playing the adjusted multimedia information.

17. The computer-readable storage medium according to claim 16, wherein the method further comprises:

performing smoothing processing on the rate ratio corresponding to each information segment of the at least one information segment to obtain a smoothed rate ratio corresponding to each information segment.

* * * * *